United States Patent
Lee et al.

(10) Patent No.: US 6,533,851 B2
(45) Date of Patent: Mar. 18, 2003

(54) KOGATION REDUCING INK

(75) Inventors: Shirley Lee, Poway, CA (US); Joe R. Pietrzyk, deceased, late of San Diego, CA (US), Susan L. Pietrzyk, leagal representative

(73) Assignee: Hewlett-Packard Company, Palo Alto, CA (US)

( * ) Notice: Subject to any disclaimer, the term of this patent is extended or adjusted under 35 U.S.C. 154(b) by 132 days.

(21) Appl. No.: 09/781,776

(22) Filed: Feb. 12, 2001

(65) Prior Publication Data

US 2003/0015119 A1 Jan. 23, 2003

(51) Int. Cl.[7] ............................................. C09D 11/02
(52) U.S. Cl. ................................ 106/31.27; 106/31.43; 106/31.58; 106/31.6; 106/31.75; 106/31.86
(58) Field of Search ........................... 106/31.27, 31.43, 106/31.58, 31.6, 31.75, 31.86

(56) References Cited

U.S. PATENT DOCUMENTS

| | | | | |
|---|---|---|---|---|
| 4,259,675 A | * | 3/1981 | Mansukhani | 106/31.58 |
| 4,790,880 A | | 12/1988 | Miller | 106/31.27 |
| 5,061,316 A | | 10/1991 | Moffatt | 106/31.27 |
| 5,062,892 A | | 11/1991 | Halko | 106/31.27 |
| 5,062,893 A | | 11/1991 | Adamic et al. | 106/31.52 |
| 5,069,718 A | | 12/1991 | Kappele | 106/31.49 |
| 5,108,501 A | | 4/1992 | Moffatt | 106/31.58 |
| 5,169,437 A | | 12/1992 | You | 106/31.58 |
| 5,207,824 A | | 5/1993 | Moffatt et al. | 106/31.58 |
| 5,271,765 A | | 12/1993 | Ma | 106/31.27 |
| 5,380,358 A | | 1/1995 | Aoki et al. | 106/31.27 |
| 5,389,132 A | | 2/1995 | Davulcu et al. | 106/31.58 |
| 5,440,330 A | | 8/1995 | Anderson et al. | 347/26 |
| 5,462,590 A | | 10/1995 | Yui et al. | 106/31.43 |
| 5,554,213 A | * | 9/1996 | Radigan et al. | 106/31.43 |
| 5,683,520 A | | 11/1997 | Edgett et al. | 134/22.19 |
| 6,323,258 B1 | * | 11/2001 | Lin et al. | 106/31.26 |

FOREIGN PATENT DOCUMENTS

| | | | |
|---|---|---|---|
| JP | 03193357 | | 8/1991 |
| JP | 03/193357 | * | 8/1991 |
| JP | 04/272970 | * | 9/1992 |

OTHER PUBLICATIONS

Derwent abstract of JP04/272970, Sep. 1992.*
English translation of JP03/193357, 8/91.*

* cited by examiner

Primary Examiner—Helene Klemanski

(57) ABSTRACT

Ink-jet printer inks wherein kogation reduction is accomplished by the addition of phosphonate additives to the inks. In a preferred embodiment, the following are utilized: sodium salt of amino tri(methylene-phosphonic acid), 1-Hydroxyethylidene-1,1,-diphosphonic acid, diethylene triaminepenta(methylenephosonic acid); and potassium salt form of hexamethylenediamine tetra(methylene phosphonic acid). Although in the examples disclosed herein, the salt form of the phosphonic acids were used, the acid form of the phosphonic acid can also be used provided the pH of the final inks are adjusted to desirable levels. Use of the above listed additives essentially eliminate kogation for the life of the pens, such as those used in Hewlett-Packard Company's thermal inkjet printers.

4 Claims, No Drawings

KOGATION REDUCING INK

BACKGROUND OF THE INVENTION

The present invention relates generally to inks used in ink-jet printers and, more particularly, to inks for reducing kogation in ink-jet printheads.

Modern thermal ink-jet printers offer a low cost, high quality, and comparatively noise-free option to other types of printers commonly used with computers. Such printers employ a resistor element in a chamber provided with an egress for ink to enter from a plenum. The plenum is connected to a reservoir for storing the ink. A plurality of such resistor elements are arranged in a particular pattern, called a primitive, in a printhead. Each resistor element is associated with a nozzle in a nozzle plate, through which ink is expelled toward a print medium. The assembly of printhead and reservoir comprises an ink-jet pen.

In operation, each resistor element is connected via conductive trace to microprocessor, where current-carrying signals cause one or more selected elements to heat up. The heating creates a bubble of ink in the chamber, which is expelled through the nozzle toward the print medium. In this way, firing of a plurality of such resistor elements in a particular order in a given primitive forms alphanumeric characters, performs area-fill, and provides other print capabilities on the medium.

A problem with inks used in such thermal in-jet printers is that the repeated heating of the resistor element over several hundreds of thousands or over millions of firings can cause breakdown of the ink, with consequent fouling of the surface of the resistor element. This process has been termed "kogation", which is defined as the build-up of residue (koga) on the resistor surface. In other words, residue on the heater elements degrades ink-jet pen performance. Degraded performance is often evidenced by, for example, loss of drop weight, loss of drop velocity, nozzle misdirects or "outs" and ink puddling on the nozzles.

Various ink compositions have been developed in an effort to reduce kogation. For example, in the anionic dyes (sulfonate or carboxylate) commonly employed in aqueous inks used in thermal ink-jet printing, sodium is generally the counter-ion used. However, while dyes containing sodium counter ions generally provide good print quality, sodium counter-ions have been found to contribute to the kogation problem.

It has been discovered, for example, that oxyanions, especially phosphates, may reduce kogation. The mechanism may be attributed to the additive eliminating or reducing adsorption of dye and/or decomposition products onto the resistor. Organic acid sulfonate, such as sodium methane sulfonate, and bile salt (e.g., sodium cholate) isopropanol/water rinse is disclosed that functions to remove phosphate antistatic material from ink foam. U.S. Pat. No. 5,440,330 discloses the additives may have some utility in reducing kogation as macrocyclic polyethers for complexing cations. In U.S. Pat. No. 5,683,520, an application of electrical pulses to ink-jet heater elements to reduce kogation. Other examples of kogation reduction techniques are set forth in U.S. Pat. Nos. 5,062,893; 5,380,358 and 5,725,647.

The aforementioned references are evidence of ongoing and broadly based attempts to eliminate, or at least substantially reduce, kogation as a problem in ink-jet printheads. While these techniques have utility in a number of cases, a need still remains for the development of ink compositions capable of reducing kogation in an effective and efficient manner.

Desirably, such compositions would not only reduce kogation over the life of the printhead but would employ low cost, readily available chemicals that are utilizable with minimal additional processing during ink formulation.

SUMMARY OF THE INVENTION

In accordance with the present invention there are provided inkjet printer inks wherein kogation reduction is accomplished by the addition of phosphonate additives to the inks. In a preferred embodiment, the following are utilized: sodium salt of amino tri(methylene-phosphonic acid), 1-hydroxyethylidene- 1,1-diphosphonic acid, 1-Hydroxyethylidene- 1,1,-diphosphonic acid, diethylene triaminepenta(methylenephosonic acid); and potassium salt form of hexamethylenediamine tetra(methylene phosphonic acid). Although in the examples disclosed herein, the salt form of the phosphonic acids were used, the acid form of the phosphonic acid can also be used provided the pH of the final inks are adjusted to desirable levels. Use of the above listed additives essentially eliminate kogation for the life of the pens, such as those used in Hewlett-Packard Company's thermal inkjet printers. The additives are readily available from Solutia, Inc., Saint Louis, Mo., which markets the same under the Solutia Dequest® and Dequest® trademarks.

Other aspects and advantages of the present invention will become apparent from the following detailed description illustrating by way of example the principles of the invention.

BEST MODE FOR CARRYING OUT THE INVENTION

Solutia Dequest® phosphonates, both acid and salt form, are used in a wide variety of industrial applications. These phosphonates provide excellent stability in aqueous systems at high temperatures, high pressures, and pH extremes. A combination of unique properties and characteristics provides a broad range of functionality including scale inhibition, sequestration, dispersion, and corrosion control. This range of functional activity enables utilization of the phosphonates in a variety of applications.

Exemplary of the phosphonates is Dequest 2016 (Na4HEDP, Sodium HEDP), 1-Hydroxyethylidene- 1,1,-diphosphonic acid tetra sodium salt, sodium salt of the following acid, having the following formula:

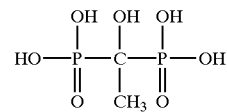

According to the present invention, the capability of the following phosphonates were tested for their ability to reduce kogation: Dequest 2054 (K6HDTMPA), Hexamethylenediamine tetra(methylene phosphonic acid), potassium salt

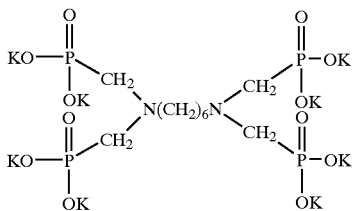

Dequest 2006 (Na2HATMP, Na2AMP, Sodium ATMP), Amino tri (methylene-phosphonic acid) pentasodium salt of the following acid:

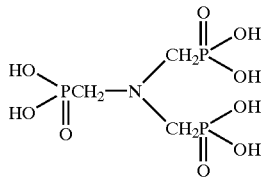

TABLE I shows a comparison between black ink containing the additive Dequest 2016 (upper curve) and black ink without the additive (lower curve). It was noted that substantially improved performance of the printheads was realized as kogation was minimized because of the presence of the additive.

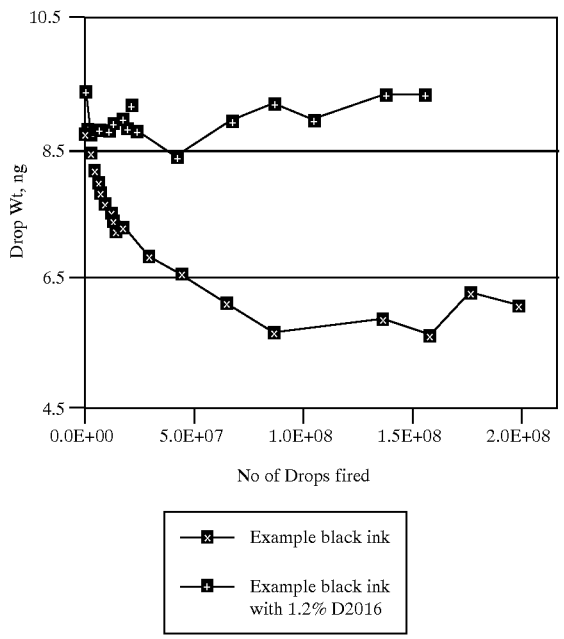

TABLE I

Drop weight vs number of drops fired

Referring now to TABLE I, there is shown drop weight, expressed in nanograms plotted against number of drops fired of thermal ink-jet pens over a life of two hundred million (200,000,000) drops, i.e. two hundred million firings of printhead resistor elements. In the upper curve, there is shown the effect of the additive Dequest 2016, present in an experimental black ink at 1.2% by weight. Presence of the additive formulation at between about 0.25% and about 3.0% is useful, while 1.2% by weight is preferred in this formulation. The lower curve shows results when the ink, without the phosphonate additive, was tested.

TABLE II shows a comparison between magenta ink containing the additive Dequest 2016 (upper curve) and magenta ink without the additive (lower curve). Again, it was noted that substantially improved performance of the printheads was realized as kogation was minimized because of the presence of the additive.

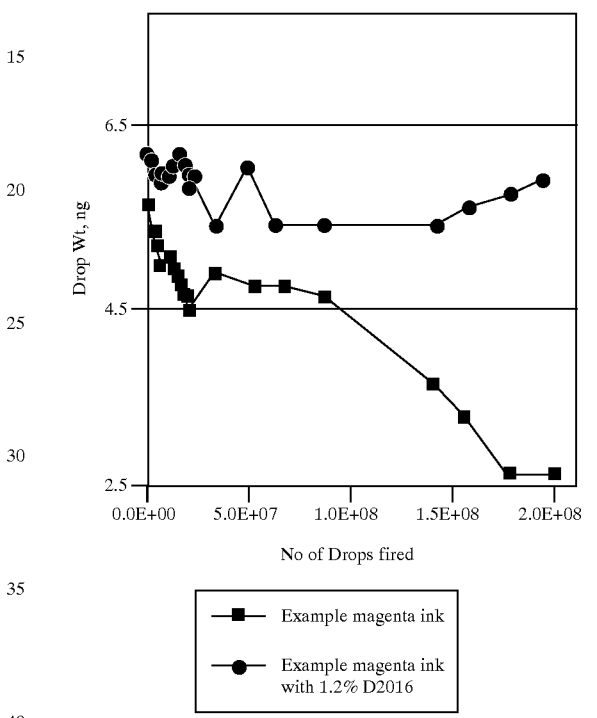

TABLE II

Drop weight vs number of drops fired

With further reference to TABLE II, there is shown a comparison between magenta ink containing the additive Dequest 2016 (upper curve) and magenta ink without the additive (lower curve). Again, it was noted that substantially improved performance of the printheads was realized as kogation was minimized because of the presence of the additive.

In summary, the results shown in TABLES I and II reveal that compositions for magenta and black ink, all containing the phosphonate additive, reduced kogation over the life of the printheads, for both magenta and black inks. In preferred embodiments, the following compositions, showing percentages by weight, were utilized:

|  | Magenta | Black |
| --- | --- | --- |
| Glycerol | 7.5 | 7.5 |
| Buffer solution to pH = 8 | 1 | 1 |
| 2-Pyrrolodone | 9.4 | 9.4 |
| Diethylene glycol | 5 | 5 |
| Trimethylolpropane | 7.5 | 7.5 |
| Tergitol 15-S5 or 7 | 0.5 |  |
| Zonyl FSO-100 | 0.4 |  |
| Surfynol 465 |  | 0.1 |
| RB31(1) |  | 46.92 |

-continued

|  | Magenta | Black |
|---|---|---|
| PF Magenta 2- (2) | 46.85 | |
| Water to make up to 100 g | | |

In the above listed compositions, RB31 is Reactive Black 31 liquid from Avecia, PF Magenta 2 is ProjetFast 2 Magenta liquid from Avecia. Tergitol 15-S5 or 7 are polyethylene glycol ethers of a mixture of fatty alcohol, having an average of 5 or 7 moles of ethylene glycol, available from Union Carbide. Zonyl FSO is a fluoro surfactant made by DuPont.

TABLE III shows a comparison between black ink containing the additive Dequest 2054 (upper curve) and black ink without the additive (lower curve). It was noted that substantially improved performance of the printheads was realized as kogation was minimized because of the presence of the additive.

TABLE III

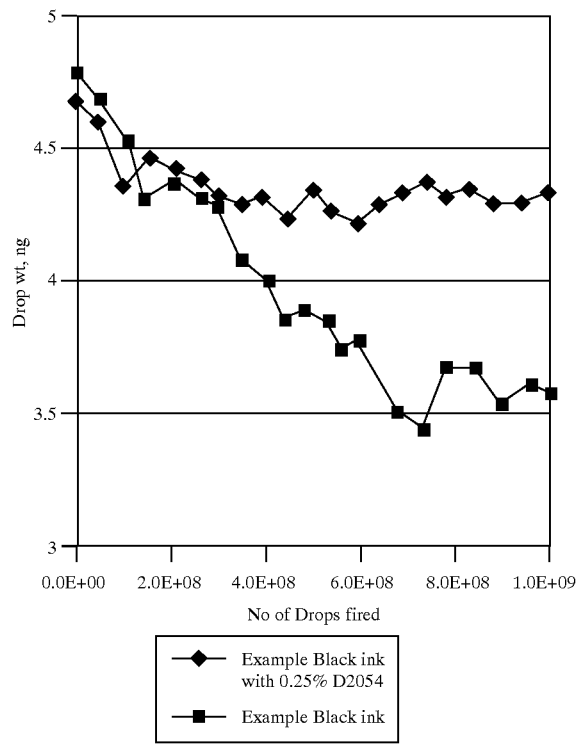

Drop Weight vs Number of Drops Fired

Referring now to TABLE III, there is shown drop weight, expressed in nanograms plotted against number of drops fired of thermal ink-jet pens over a life of two hundred million (200,000,000) drops, i.e. two hundred million firings of printhead resistor elements. In the upper curve, there is shown the effect of the additive Dequest 2054, present in an experimental black ink at 0.25% by weight. Presence of the additive at between about 0.15% and about 0.3% is useful, while 0.25% by weight is preferred. All three examples show that, with phosphonate additive, the drop weight change over the life of the pen is reduced.

The present invention may be embodied in other specific forms without departing from its spirit or essential characteristics. The described embodiment is to be considered in all respects only as illustrative and not restrictive. The scope of the invention is, therefore, indicated by the appended claims rather than by the description thereof. All changes which come within the meaning and range of equivalency of the claims are to be embraced within their scope.

What is claimed is:

1. A method of reducing kogation in ink-jet printheads, comprising:

printing with the ink-jet printheads using ink comprising colorants, a water base; and a phosphonate additive, the phosphonate additive being selected from the group consisting of amino tri methylene-phosphonic acid, 1-hydroxyethylene-1,1-diphosphonic acid, hexamethylenediamine tetra(methylene phosphonic acid), 1-hydroxyethylidene-1,1-diethylene triaminepenta (methylenephosphonic acid).

2. The method according to claim 1, wherein said phosphonate additive is present in concentration between about 0.25% to about 3.0% by weight of said ink.

3. The method according to claim 1, wherein said phosphonate additive is present in concentration of about 0.15 to about 0.3% by weight.

4. The method according to claim 1, wherein said phosphonate is present in the acid form or the salt form.

* * * * *

UNITED STATES PATENT AND TRADEMARK OFFICE
CERTIFICATE OF CORRECTION

PATENT NO. : 6,533,851 B2  Page 1 of 1
DATED : March 18, 2003
INVENTOR(S) : Lee et al.

It is certified that error appears in the above-identified patent and that said Letters Patent is hereby corrected as shown below:

Column 6,
Line 44, delete "1-hydroxyethylidene-1,1-diethylene triaminepenta" and insert therefor -- 1-hydroxyethylidene-1, 1-diphosphonic acid, and diethylene triaminepenta --.

Signed and Sealed this

Twenty-seventh Day of January, 2004

JON W. DUDAS
*Acting Director of the United States Patent and Trademark Office*